C. S. HUTTON.
COUPLING.
APPLICATION FILED MAR. 23, 1912.

1,071,235.

Patented Aug. 26, 1913.

WITNESSES:

INVENTOR
C. S. Hutton
BY W. T. Fitzgerald Co.
Attorney

UNITED STATES PATENT OFFICE.

CLYDE S. HUTTON, OF CONYNGHAM, PENNSYLVANIA.

COUPLING.

1,071,235.   Specification of Letters Patent.   Patented Aug. 26, 1913.

Application filed March 23, 1912. Serial No. 685,744.

*To all whom it may concern:*

Be it known that I, CLYDE S. HUTTON, a citizen of the United States, residing at Conyngham, in the county of Luzerne and State of Pennsylvania, have invented certain new and useful Improvements in Couplings; and I do hereby declare the following to be a full, clear, and exact description of the invention, such as will enable others skilled in the art to which it appertains to make and use the same.

My invention relates to new and useful improvements in couplings and more particularly to couplings for joining the adjacent ends of pipe sections.

The object of my invention is to provide a pipe coupling and gaskets of peculiar construction adapted to be used in said coupling, whereby all leakage from said coupling will be prevented.

Other objects and advantages of my invention will be hereinafter made clearly apparent in the specification and pointed out in the claim.

In the accompanying drawings I have shown the preferred form which my invention may take.

Figure 1:
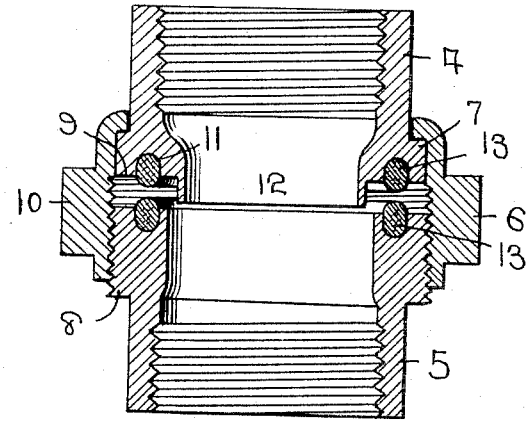
Figure 2:
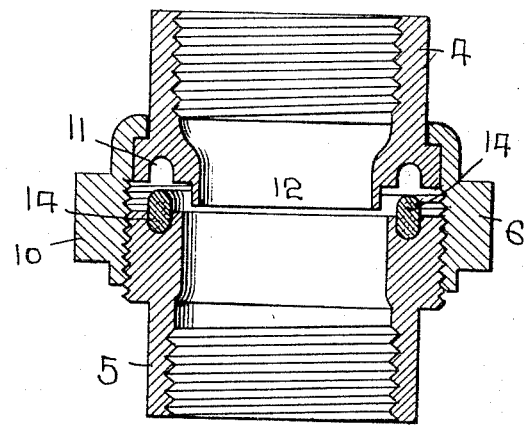
Figure 3:
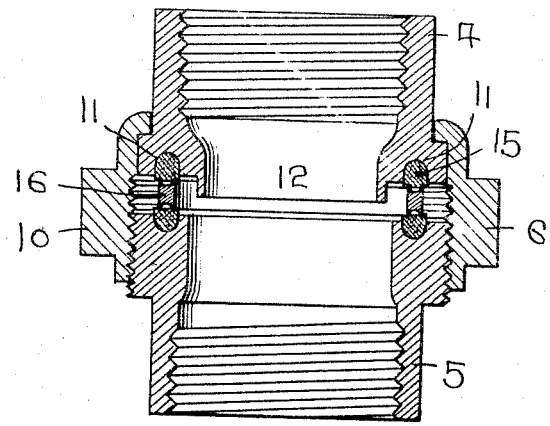

In said drawings, Figure 1 is a longitudinal sectional view through my improved form of pipe coupling, showing one form of gasket. Fig. 2 is a similar view, showing another form of gasket, and, Fig. 3 is a similar view, showing a still different form of gasket.

Referring to the drawings, in which similar reference numerals designate corresponding parts throughout the several views, 4 and 5 are sections of my improved form of coupling, which are adapted to be secured to the adjacent ends of pipe sections (not shown) and 6 is a ring for drawing said sections 4 and 5 together. The sections 4 and 5 are internally screw threaded at their outer ends and are adapted to be engaged with the exteriorly screw threaded ends of pipe sections. The inner end of the section 4 has a flange 7 therearound and the section 5 has upon its inner end an enlarged flange 8, which is exteriorly screw threaded. The ring 6 has one end reduced in diameter, as shown at 9, and its opposite end interiorly screw threaded, the central portion of said ring being preferably enlarged and provided with a hexagonal nut 10 so as to be readily engaged by means of a wrench.

After the sections 4 and 5 have been properly secured to the ends of pipe sections, the ring 6 is disposed upon said sections and turned so that the threaded end thereof will engage the threaded flange 8 and said sections 4 and 5 will therefore be drawn toward one another. The inner surfaces of said sections 4 and 5 have similar and oppositely disposed grooves 11 therearound and the section 4 has an inwardly extending flange 12, which is adapted to extend into the section 5 when said sections 4 and 5 are assembled. In order that leakage between sections 4 and 5 may be prevented, I desire to employ a pair of rings 13, formed of lead or other soft metal, one of said rings being disposed in each of the grooves 11 and projecting slightly therefrom. When the sections 4 and 5 are drawn tightly together the rings 13 will be forced tightly together, the joining surfaces of said rings being spread, due to the rings being of soft metal.

In Fig. 2 I have shown the use of a single ring 14, of greater width than the combined depth of the grooves 11 in the two sections and with this construction when the sections are brought together, every portion of the two sections will be completely filled with the soft metal and all leakage between said sections effectually prevented.

In Fig. 3 I have shown a still further form of gasket. In said figure I have shown the use of a pair of rings 15, which are of slightly greater width than the depth of the grooves 11 and having one side flattened. The rings 15 are disposed in the grooves 11 so that the flat sides of said rings will adjoin.

When it is desired to secure the sections together, I interpose a ring 16 between the rings 15, said ring 16 being of slightly greater internal diameter and slightly less external diameter than the rings 15 and having its side surfaces concave, as clearly shown. The ring 16 is preferably formed of copper, or of some other desired suitable metal, which is harder than the metal forming the rings 15.

When the ring 6 is rotated to draw the sections together, the side edges of said ring 16 will be forced into the softer metal of the rings 15 and will effectually prevent all leakage between the sections 4 and 5.

Owing to the opposite concaved faces in the ring 16 it will be seen that the ring is provided with cutting edges at opposite sides of the respective concaved surfaces, while these concaved surfaces are relatively shallow and the middle portions thereof are substantially in parallel relation with the contiguous surfaces of the relatively soft rings upon which they rest when the cutting edges have entered the said contiguous surfaces. Therefore, in securing the element 10 upon the elements 4 and 5, for bringing them into proximity, and for forcing the cutting edges and concaved surfaces into their finally seated position, it is only necessary to rotate said element 10, very few revolutions. Whereas, if these cutting edges were formed by a V-shaped groove instead of concaved surfaces, the depth would be far greater in proportion to the angularity of the cutting edges or elements than is the case in the present invention.

From the foregoing description it will be seen that I have provided a pipe coupling and gasket therefor, by means of which adjacent ends of pipe sections may be rigidly secured together and all leakage between said sections prevented. It will also be seen that the parts of my device may be readily and cheaply manufactured.

While I have shown the preferred form which my invention may take, I desire it to be understood that I may make certain modifications therein without departing from the spirit and scope of my invention.

What I claim as new is:

In a pipe coupling, a pair of coupling sections provided with means for drawing them toward one another, a pair of relatively soft metal rings fitted between said coupling sections, and a ring of relatively hard metal provided with opposite concaved faces and with cutting edges at opposite sides of the respective concaved faces, said relatively hard ring being interposed between the relatively soft rings and having its cutting edges in position to enter the contiguous surfaces of the respective relatively soft rings, so that said concaved portions may be brought to rest upon the contiguous surfaces of the relatively soft rings, and substantially as shown for the purpose specified.

In testimony whereof I have signed my name to this specification in the presence of two subscribing witnesses.

CLYDE S. HUTTON.

Witnesses:
 FRANKLIN BRUNDY,
 HENRY F. SACHSE.